No. 869,136. PATENTED OCT. 22, 1907.
J. E. BURTON.
DRAG ATTACHMENT FOR PLOWS.
APPLICATION FILED MAR. 6, 1907.
2 SHEETS—SHEET 1.
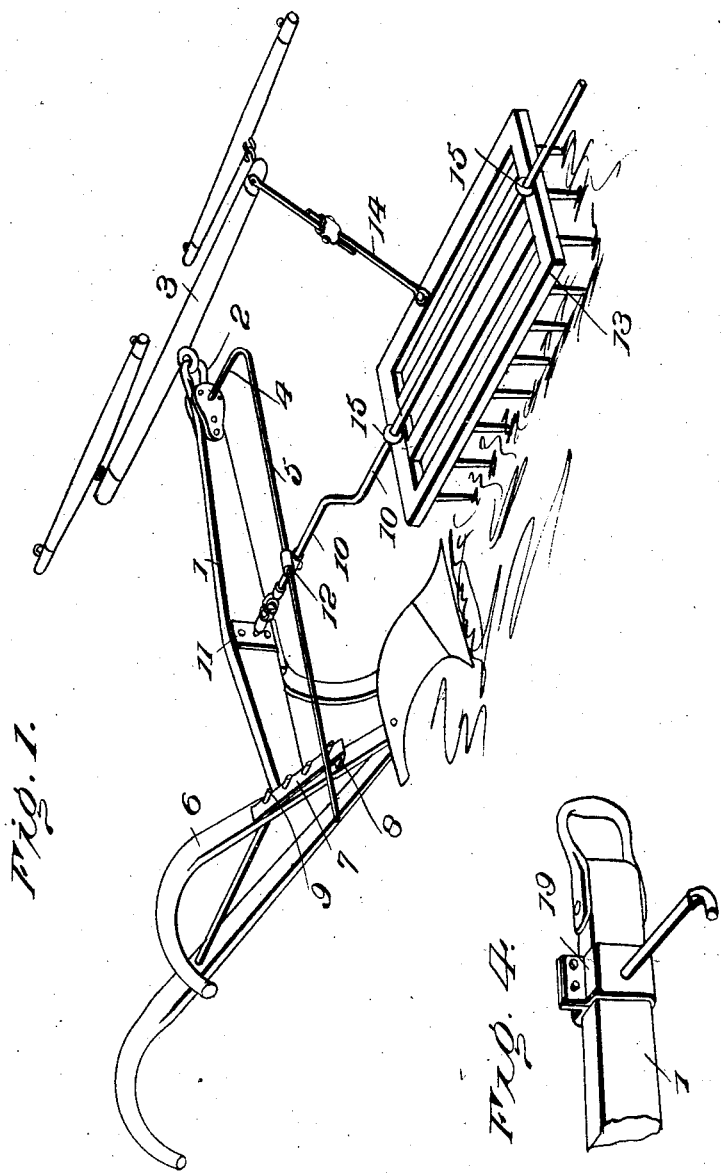
Witnesses
Inventor
J. E. Burton
By
Attorneys No. 869,136. PATENTED OCT. 22, 1907.
J. E. BURTON.
DRAG ATTACHMENT FOR PLOWS.
APPLICATION FILED MAR. 6, 1907.
2 SHEETS—SHEET 2.
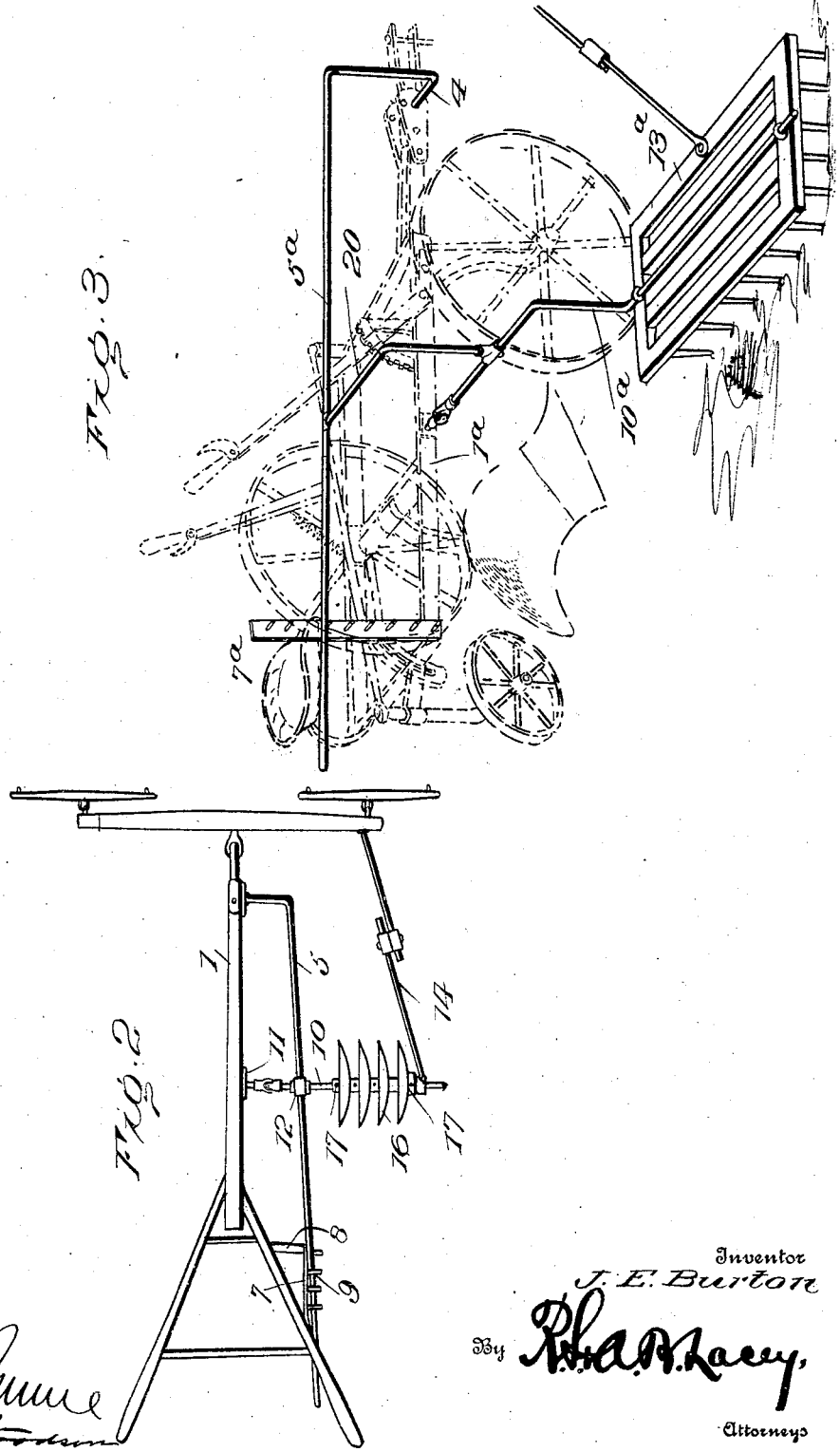
Inventor
J. E. Burton
Witnesses
By
Attorneys

UNITED STATES PATENT OFFICE.

JAMES E. BURTON, OF WHITEWATER, WISCONSIN.

DRAG ATTACHMENT FOR PLOWS.

No. 869,136.     Specification of Letters Patent.     Patented Oct. 22, 1907.

Application filed March 6, 1907. Serial No. 360,852.

To all whom it may concern:

Be it known that I, JAMES E. BURTON, a citizen of the United States, residing at Whitewater, in the county of Walworth and State of Wisconsin, have invented certain new and useful Improvements in Drag Attachments for Plows, of which the following is a specification.

This invention contemplates certain new and useful improvements in drag or harrow attachment for plows, and the invention has for its object a simple, durable, and efficient construction of plow attachment, by which a harrow, smoother, roller, or pulverizer, or other cultivator tool or implement may be drawn along the fields with the plow, so that the subsequent operation of rolling or pulverizing the clods may be performed immediately after the ground has been plowed up and before the soil shall have a chance to harden.

With this and other objects in view as will more fully appear as the description proceeds, the invention consists in certain constructions, arrangements and combinations of the parts which I shall hereinafter fully describe and then point out the novel features in the appended claims.

For a full description of the invention and the merits thereof and also to acquire a knowledge of the details of construction of the means for effecting the result, reference is to be had to the following description and accompanying drawings, in which:

Figure 1 is a perspective view of a walking plow provided with the improvements of my invention; Fig. 2 is a top plan view, illustrating a modification; Fig. 3 is a perspective view of a sulky plow with the invention attached; and, Fig. 4 is a detail perspective view of a modification hereinafter referred to.

Corresponding and like parts are referred to in the following description and indicated in all the views of the drawings by the same reference characters.

Referring to the drawing, the numeral 1 designates a beam of a plow of the walking type, 2 the vertically adjustable clevis thereof, and 3 the whiffletree secured to said clevis.

4 designates a pin which may be used as the pin to secure the clevis to the clevis plates in an adjustable manner to raise or lower the draft, and to one end of said pin 4 a lever 5 is connected as illustrated in the drawing.

6 designates the handles of the plow.

To one of the handles 6 a vertically extending latch bar 7 is secured, braced at its lower end preferably by a cross bar 8. The said latch bar is provided with a series of notches 9 which may be formed in any desired manner, as by a series of spaced pins, and the rear end of the lever 5 is adapted for insertion in any of said notches, whereby the rear end of said lever may be held at different elevations or adjustments.

10 designates a rod which is connected to the plow beam 1 by means of a clip 11, or any other attaching device, and said rod is pivotally connected to said support, so as to swing both rearwardly and forwardly and up and down. The outer end of the rod 10 is cranked as shown and to such cranked extremity, a harrow 13 may be connected, said harrow being of the toothed type in the instance shown and being connected to the whiffle-tree 3 by means of an extensible hitch 14. Intermediate of its ends, the rod 10 is provided with a loop 12 which is secured thereon in an adjustable manner by means of a set screw, or the like, and a lever 5 extends through said loop, as shown.

From the foregoing description in connection with the accompanying drawings, it will be evident that the said harrow 13 may be raised or lowered by means of the lever 5 and its connections, and that the said harrow may also be held at different inclinations with respect to the plow beam by means of the adjustable hitch 14. As the rod 10 and lever 5 may be made of comparatively light or springy material, the harrow may yield readily to pass over stones and the like, and the entire device may be elevated whenever desired by raising the rear end of the lever. It is obvious that this may be accomplished in an expeditious manner, by merely disengaging the rear end of said lever from the notch in which it happens to rest.

It is obvious that my invention is not limited to the toothed harrow 13 above mentioned, as any form of drag may be employed with my invention. For instance, as shown in Fig. 2 the toothed harrow 13, which is provided with loops 15 receiving the cranked extremity of the rod 10 may be replaced by a disk harrow 16, the disks being strung on the crank extremity of the rod and being held thereon by collars 17 set on said extremity by means of lock nuts, or, if desired, a roller may be used in lieu of the harrows.

Instead of using the pin 4 as a fulcrum or support for the lever 5 upon the beam, I may, with some types of plow beams or clevises, employ a clip 19 as the fulcrum or support for the lever.

It is to be particularly noted, that as the loop 12 may be secured at different points along the rod 10 by means of its set screw, the said loop may be adjusted so as to securely hold the lever 5 into engagement with the notched latch bar 7.

As illustrated in Fig. 3, my invention is applicable to wheeled or sulky plows as well as to walking plows. In this view 13$^a$ designates the harrow or drag device, 10$^a$ the rod which is secured thereto and also secured to one of the beams 1$^a$ of the framework or beam of plow, 7$^a$ the latch bar designed for engagement by the lever 5$^a$, and 20 a depending arm secured to said lever and operatively connected to the rod 10$^a$, as shown. It is to be understood that my invention is not limited to the exact form, proportions or arrangements of the parts herein shown, and that changes may be made in the form, design, or arrangement of the parts within the scope of the appended claims. For instance, the lever 5 may be fulcrumed or attached at any convenient point of the plow beam, frame or tongue, the rod 10 may be pivoted at any convenient point on the beam, frame or any part of the apparatus and the latch bar likewise may be attached to any convenient part of the plow beam or frame, or even to the seat of the plow.

Having thus described the invention, what is claimed as new is:

1. The combination with a plow, of a laterally extending rod projecting from said beam and pivotally connected thereto, a drag connected to the outer end of said rod, a draft device for said drag, a lever fulcrumed on the beam and connected intermediate of its ends to said rod to raise and lower the same, a vertically extending latch bar provided with a series of notches with which the rear end of the lever is adapted for engagement, and a support on the plow for said latch bar.

2. The combination with a plow and the beam and handle thereof, of a rod extending laterally from said beam and pivotally connected thereto, a drag mounted upon the outer end of said rod, a draft connection for said drag, a lever fulcrumed on the beam, a loop adjustably connected to said rod and through which said lever extends rearwardly, and a notched latch bar connected to one of the handles of the plow and arranged for engagement by the rear end of said lever.

3. In a plow and its beam and handles, the combination of a rod extending laterally from said beam and pivotally connected thereto, a drag mounted on the outer end of said rod, a draft connection for said drag, a lever fulcrumed at its front end on the beam, a loop mounted to slide on said rod and provided with a set screw whereby its position may be maintained at different points along the rod, the lever extending rearwardly through said loop, and a notched latch bar secured to one of the handles and with which the rear end of the lever is adapted to engage.

In testimony whereof I affix my signature in presence of two witnesses.

JAMES E. BURTON. [L. S.]

Witnesses:
  I. U. WHEELER,
  C. W. TRATT.